US006912382B2

(12) United States Patent
Fellenstein et al.

(10) Patent No.: US 6,912,382 B2
(45) Date of Patent: Jun. 28, 2005

(54) SYSTEM AND METHOD FOR ENHANCED TELEPHONE CUSTOMER USAGE DETAILS

(75) Inventors: Craig William Fellenstein, Brookfield, CT (US); Rick Allen Hamilton, II, Charlottesville, VA (US); Timothy Moffett Waters, Richmond, VA (US)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 10/156,785

(22) Filed: May 24, 2002

(65) Prior Publication Data

US 2003/0220093 A1 Nov. 27, 2003

(51) Int. Cl.[7] .............................................. H04M 11/00
(52) U.S. Cl. ........................ 455/405; 455/407; 455/411
(58) Field of Search ................................ 455/405, 411, 455/406, 407, 408, 414.1, 432.1

(56) References Cited

U.S. PATENT DOCUMENTS

| | | | | |
|---|---|---|---|---|
| 5,353,335 | A | | 10/1994 | D'Urso et al. ................. 379/67 |
| 5,748,720 | A | * | 5/1998 | Loder .......................... 455/406 |
| 5,826,185 | A | * | 10/1998 | Wise et al. ................... 455/405 |
| 5,983,091 | A | | 11/1999 | Rodriguez ................... 455/405 |
| 6,032,053 | A | | 2/2000 | Schroeder et al. .......... 455/553 |
| 6,058,173 | A | | 5/2000 | Penfield et al. ............. 379/144 |
| 6,185,414 | B1 | * | 2/2001 | Brunner et al. ............. 455/406 |
| 6,351,639 | B1 | | 2/2002 | Motohashi ................... 455/420 |
| 2001/0009849 | A1 | * | 7/2001 | Hanson ....................... 455/408 |
| 2002/0102962 | A1 | * | 8/2002 | Grinn et al. ................. 455/406 |
| 2003/0119477 | A1 | * | 6/2003 | Uppal et al. ................. 455/408 |

* cited by examiner

*Primary Examiner*—Emmanuel L. Moise
*Assistant Examiner*—Huy D Nguyen
(74) *Attorney, Agent, or Firm*—VanLeeuwen & VanLeeuwen; David A. Mims, Jr.

(57) ABSTRACT

A system and method for enhanced telephone customer usage details is presented. A user is able to configure one or more telephone accounts to limit the amount of telephone usage. The user sets usage limits corresponding to one of the telephone accounts and processing verifies that the usage limits are not exceeded during each telephone call. When processing determines that a particular telephone call is approaching a usage limit, processing sends an audible message to the user. When processing determines that a particular telephone call has reached a usage limit, processing terminates the telephone call. The user may display telephone usage information on his telephone display or the user may configure processing to provide an audio message corresponding to his account information.

20 Claims, 8 Drawing Sheets

SYSTEM AND METHOD FOR ENHANCED TELEPHONE CUSTOMER USAGE DETAILS

BACKGROUND OF THE INVENTION

1. Technical Field

The present invention relates in general to a system and method for enhanced telephone customer usage details. More particularly, the present invention relates to a system and method for accessing telephone account information and imposing limits on telephone usage.

2. Description of the Related Art

The cost of using a stationary phone or mobile phone has decreased which as increased the popularity of telephone use. Many users have multiple telephone accounts, such as a home phone number and a mobile phone number. Additionally, some parents establish mobile phone accounts for their children in which the parents pay for their children's telephone use. Telephone service providers promote many types of service plans to attract customers. Some service plans have a high monthly fee but have unlimited telephone use including long distance calls. Other service plans have a low monthly fee but a user is charged for usage on a per minute basis and is also charged for long distance calls.

A challenge found the existing art is that there does not exist a real-time simple method to access acquired telephone charges for a particular account. In order to check long distance usage, toll calls, and local toll calls, a user contacts the service provider's customer support desk and inquires about the account. Some service providers offer an online service using a web-based lookup system. In addition, cellular phones use a call feature that connects to an automated customer support desk which provides account information from an accounting database. This information includes minutes used in-plan and out-of-plan as well as billing information and account balances. If a user wishes to access multiple telephone accounts, these access methods can be very time consuming.

Furthermore, a challenge found with the existing art is its ability to cost effectively limit the amount of phone usage for a particular account. For example, a parent who pays for a child's mobile phone use may wish to limit the total monthly charges of the corresponding telephone account to $20. Pre-paid telephone cards and plans are currently used to manage telephone usage costs. However, pre-paid plans may have hidden costs which make the plan non-cost effective.

First, pre-paid plans may have connection fees which are also called first-minute surcharges. Connection fees may be charged when a telephone call is connected. Second, pre-paid plans may include a monthly tax or one-time tax. Third, pre-paid plans may have a maintenance fee which may be deducted from a phone card every month, every two weeks, or every week. Fourth, pre-paid plans may have a high "minute rounding" charge. The industry standard is one minute rounding, as in the case of residential telephone services. Pre-paid plans may be rounded to one, two, or even three minutes. For example, a 30 seconds phone call may be charged as a 3-minute phone call. What is needed, therefore, is a simple and quick way to access one or more telephone account usage details with the ability to cost effectively limit telephone use for a particular billing cycle.

SUMMARY

It has been discovered that a user may use a single button account management feature to check the telephone usage corresponding to an account and set usage limitations on the particular account.

The user sends an account information request and authorization information to a service provider by depressing a button on his telephone. The service provider receives the request and verifies the user is authorized to access the corresponding account. Once verified, the service provider accesses the requested account information and sends the account information to the user's telephone through a communication network, such as the Public Switched Telephone Network (PSTN). The telephone receives the account information and stores the account information in a local storage area. The account information may then be displayed on a telephone display or converted to an audio message using a voice synthesizer and sent to the telephone's speaker.

If the user wishes to set limitations on his corresponding telephone account, the user uses the telephone to set account limitations. For example, the user may wish to limit the number of available daily minutes for use on his account. The user may be able to set limitations for multiple accounts using a single telephone provided the user has proper authorization.

In one embodiment, the user may set account limitations through the Internet using a web-based software program. For example, the user may log on to service provider's web page and access his account to set account limitations.

When the user wishes to place a telephone call, processing compares the existing account activity with the user's imposed limitations. If the existing account activity has not reached the user's imposed limitations, processing completes the telephone call. On the other hand, if the existing account activity has reached one or more account limitations, processing blocks the call and sends a message to the user specifying why the call was blocked.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
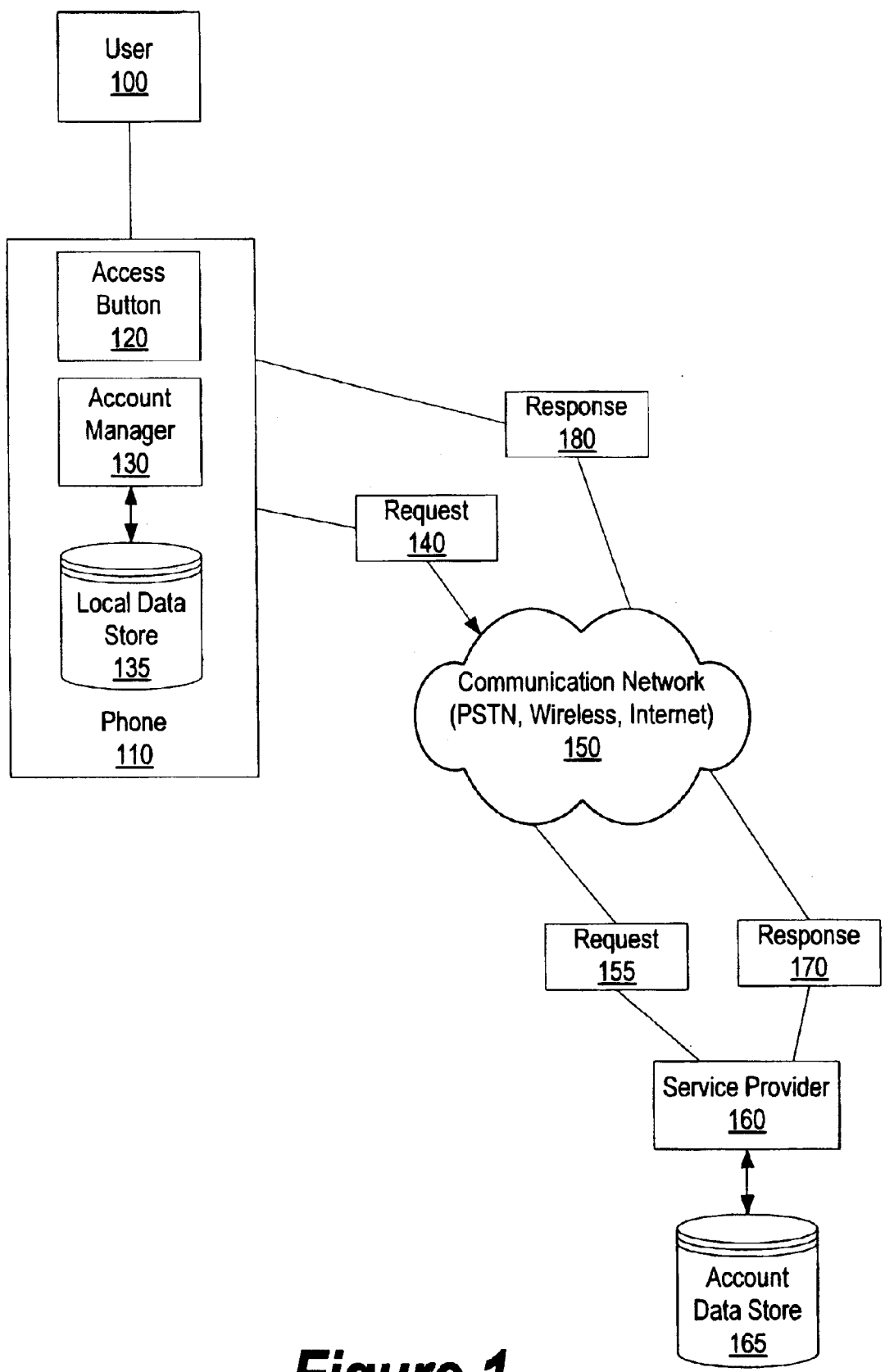
FIG. 1 is a high-level diagram showing a user accessing and changing telephone account information.

FIG. 1 is a high-level diagram showing a user accessing and configuring telephone account information. User 100 uses phone 110 to place telephone calls and access account information. Phone 110 includes access button 120, account manager 130, and local data store 135. Access button 120 may be a single button which sends a request to user 100's service provider to access account information. In one embodiment, access button 120 may be a sequence of buttons which user 100 depresses to access account information (i.e. 1,2,3,#). Account manager 130 may be a software program which sends account requests and stores relevant account information, such as minutes used during a month, on local data store 135. Local data store 135 may be stored on a non-volatile storage area, such as non-volatile memory.

User 100 depresses access button 120 which sends request 140 to service provider 160 through communication network 150, such as a Public Switched Telephone Network (PSTN), wireless network, or the Internet. Service provider 160 receives and processes request 155 (see FIG. 2 and corresponding text for further details regarding user request processing). If request 155 is requesting account information, service provider 160 may proceed through an authorization sequence to ensure user 100 is authorized to access the requested account. Request 155 may include authorization information, such as a user name and a password.

When processing authorizes the request, service provider 160 accesses the requested account information from account data store 165. Service provider 160 sends response 170 to phone 110 through communication network 150. Response 170 includes account information corresponding to request 140. Phone 110 receives response 180 and account manager 130 stores the account information in local data store 135. Account manager 130 may then display the account information on a display. Account manager 130 may convert the account information to an audio message if phone 110 does not have a display. In one embodiment, service provider 160 may provide account information to phone 110 using an audio signal instead of providing account information in data form.

Figure 4:
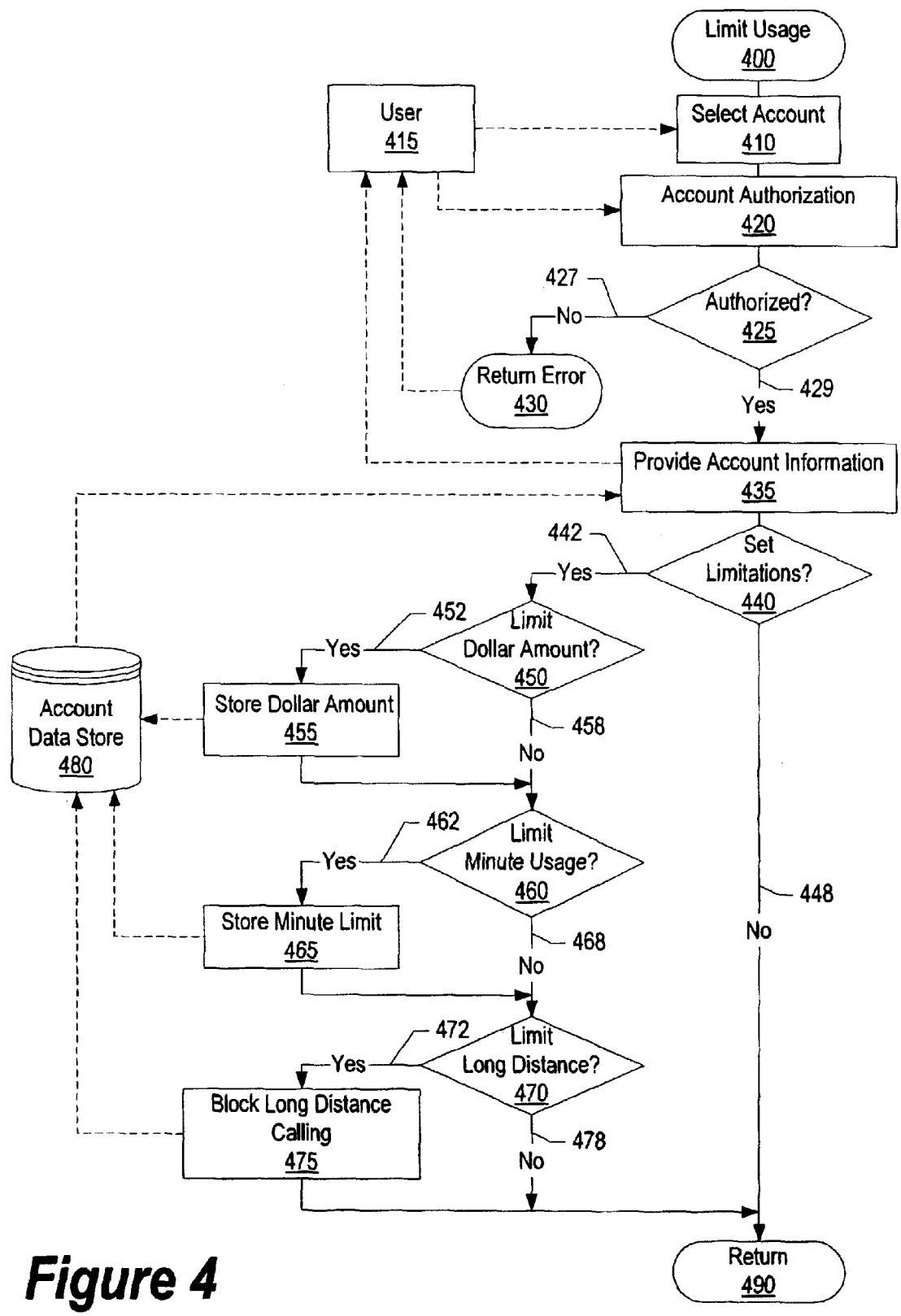
FIG. 4 is a flowchart showing steps taken in limiting usage corresponding to a telephone account.

If user 100 wishes to set limitations on his corresponding telephone account, user 100 uses phone 110 to send request 140 which includes a limitation request to service provider 160 through communication network 150 (see FIG. 4 and corresponding text for further details regarding account limitation settings). For example, request 140 may include a request to limit the monthly dollar amount that may be charged to the corresponding telephone account. Service provider 160 stores the limitation request in account data store 165 corresponding to the telephone account.

In one embodiment, user 100 may set account limitations through the Internet using a web-based software program. For example, user 100 may log on to service provider 160's web page and access his account to set account limitations.

When user 100 wishes to place a telephone call, processing retrieves account limitation information and current telephone usage information (i.e. amount of minutes used and current billing amount) from local data store 135. If the telephone usage information has not reached the limitations imposed on the telephone account, processing completes the telephone call (see FIG. 6 and corresponding text for further details regarding call authorization). On the other hand, if the usage information has reached one or more account limitations, processing blocks the telephone call (i.e. the account has reached a usage limit). If account limitations have not been reached, processing may set a timer to track the amount of time of the telephone call. Processing may monitor the timer to ensure the telephone call does not exceed a per-call usage limit. If the timer reaches the per-call limit, processing terminates the telephone call (see FIG. 7 and corresponding text for further details).

Figure 2:
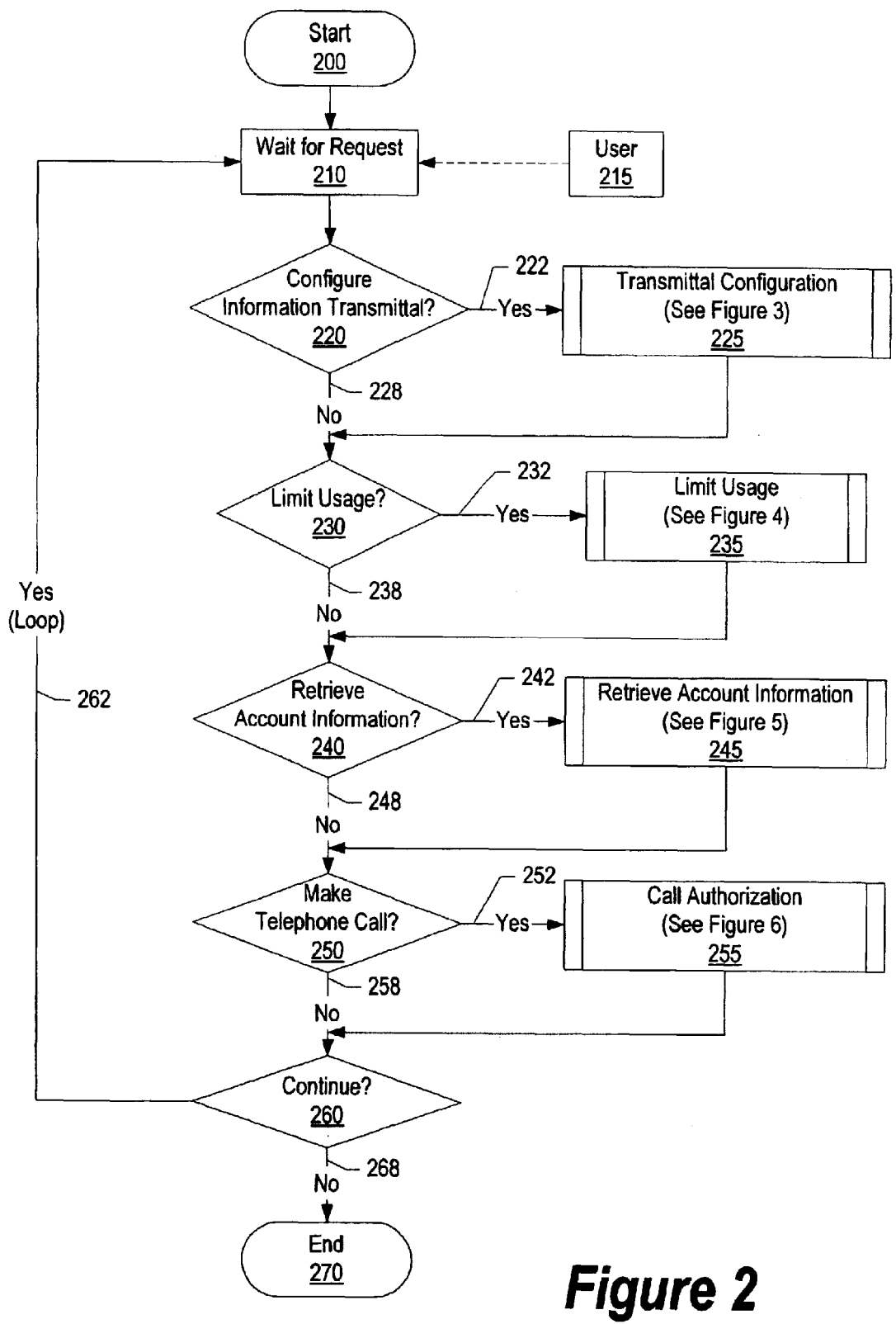
FIG. 2 is a high-level flowchart showing steps taken in managing telephone account information and placing a telephone call.

FIG. 2 is a high-level flowchart showing steps taken in a user managing telephone account information and requesting authorization to place a telephone call. Processing commences at 200, whereupon processing waits for a request from user 215 (step 210). When user 215 sends a request, a determination is made as to whether the user wishes to configure his account information transmittal interval (decision 220). For example, user 215 may wish to configure his account to automatically transmit account information to his telephone every 24 hours.

Figure 3:
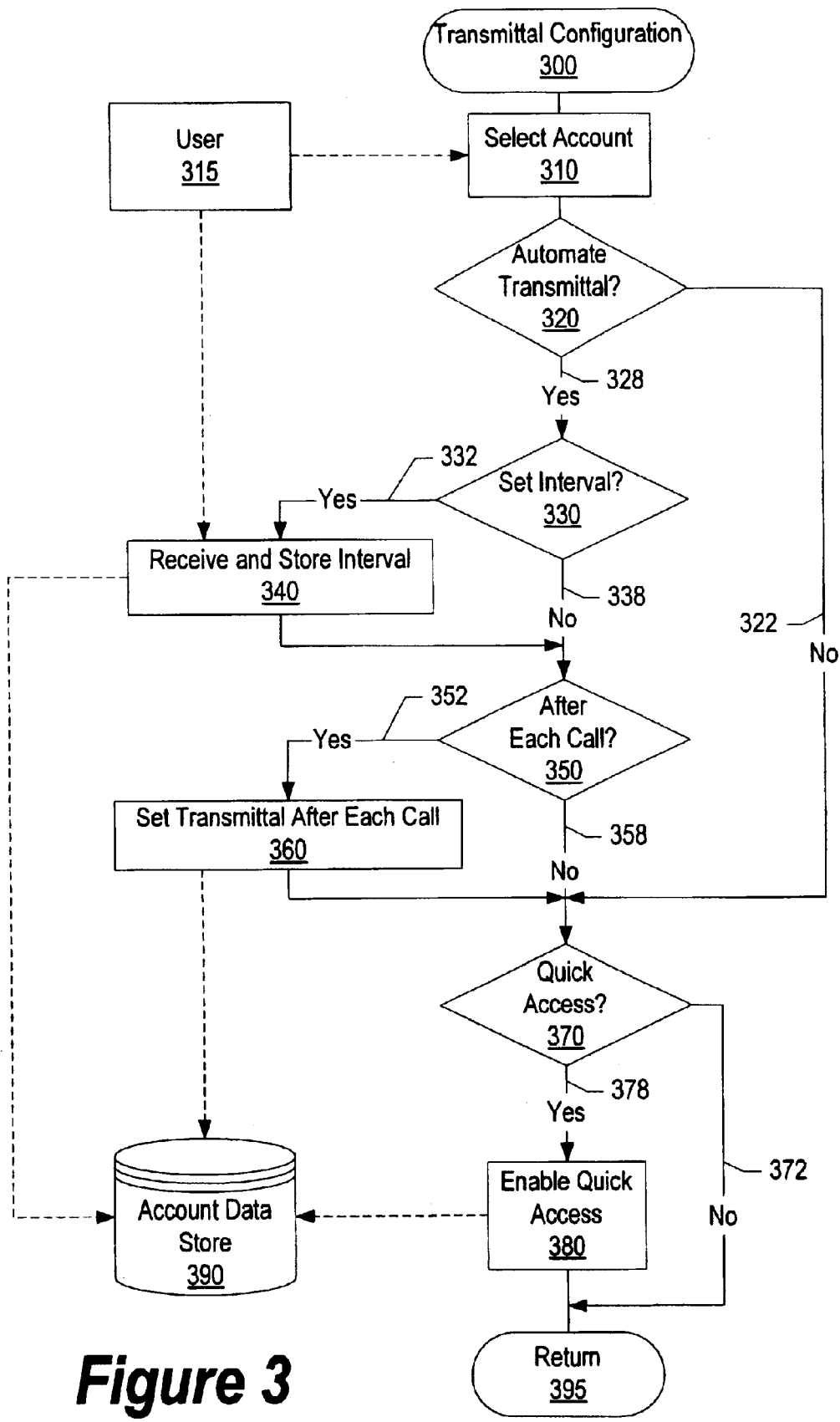
FIG. 3 is a flowchart showing steps taken in configuring information retrieval occurrence.

If user 215 wishes to configure his account information transmittal interval, decision 220 branches to "Yes" branch 222 whereupon transmittal configuration processing occurs (pre-defined process block 225, see FIG. 3 and corresponding text for further details). On the other hand, if the user does not wish to configure his account information transmittal interval, decision 220 branches to "No" branch 228 bypassing transmittal interval configuration steps.

A determination is made as to whether the user wishes to limit telephone usage (decision 230). For example, user 215 may wish to impose a $20 monthly limit on his telephone account. If the user wishes to limit telephone usage, decision 230 branches to "Yes" branch 232 whereupon limit usage processing occurs (pre-defined process block 235, see FIG. 4 and corresponding text for further details). On the other hand, if user 215 does not wish to limit telephone usage, decision 230 branches to "No" branch 238 bypassing usage limitation steps.

A determination is made as to whether user 215 wishes to retrieve telephone account information (decision 240). For example, the user may wish to know how many long distance minutes the user has incurred during the current month. If user 215 wishes to retrieve account information, decision 240 branches to "Yes" branch 242 whereupon processing provides account information (pre-defined process block 245, see FIG. 5 and corresponding text for further details). On the other hand, if user 215 does not wish to retrieve account information, decision 240 branches to "No" branch 248 bypassing account retrieval steps.

A determination is made as to whether user 215 wishes to place a telephone call (decision 250). If user 215 wishes to place a telephone call, decision 250 branches to "Yes" branch 252 whereupon call authorization processing occurs (pre-defined process block 255, see FIG. 6 and corresponding text for further details). On the other hand, if the user does not wish to place a telephone call, decision 250 branches to "No" branch 258 bypassing call authorization steps.

A determination is made as to whether to continue processing (decision 260). If processing should continue, decision 260 branches to "Yes" branch 262 which loops back to wait for the next request from user 215. This looping continues until processing terminates, at which point decision 260 branches to "No" branch 268. Processing ends at 270.

FIG. 3 is a flowchart showing steps taken in configuring an account information transmittal interval. Transmittal interval configuration processing commences at 300, whereupon user 315 selects a telephone account at step 310. In one embodiment, processing may require user 315 to step through an authorization sequence when accessing a telephone account (i.e. user name and password).

A determination is made as to whether user 315 wishes to automate an account information transmittal interval (decision 320). For example, user 315 may wish to configure processing to automatically send account information every 24 hours. If user 315 does not wish to configure automated information transmittal, decision 320 branches to "No" branch 322 bypassing account transmittal automation steps. On the other hand, if user 315 wishes to automate account information transmittal, decision 320 branches to "Yes" branch 328.

A determination is made as to whether user 315 wishes to set a time interval for transmitting account information (decision 330). Using the example described above, the user may wish to set a time interval for a 24-hour period. If user 315 wishes to set a time interval corresponding to transmitting account information, decision 330 branches to "Yes" branch 332 whereupon processing receives a time interval from user 315 and stores the time interval in account data store 390. Account data store 390 may be stored on a non-volatile storage area, such as a computer hard drive. On the other hand, if user 315 does not wish to specify a time interval for account information transmittal, decision 330 branches to "No" branch 338 bypassing transmittal interval steps.

A determination is made as to whether user 315 wishes to configure processing to send account information to the user's telephone after each telephone call (decision 350). If user 315 wishes to configure processing to send account information to his telephone after each telephone call, decision 350 branches to "Yes" branch 352 whereupon processing stores information (i.e. sets a flag) in account data store 390 signifying that account information should be sent to the user's telephone after each telephone call. On the other hand, if user 315 does not wish to have processing send account information to his telephone after each telephone call, decision 350 branches to "No" branch 358 bypassing after call transmittal steps. In one embodiment, the user may specify that account information should be sent after each long distance call.

A determination is made as to whether user 315 wishes to enable account information quick access (i.e. single button access). For example, the user may wish to configure his account to have processing send account information each time a single button is pushed, such as the "#" key. If user 315 wishes to enable account information quick access, decision 370 branches to "Yes" branch 378 whereupon quick access is enabled and the selected keystrokes (i.e. "#") are stored in account data store 390 (step 380). On the other hand, if user 315 does not wish to enable account information quick access, decision 370 branches to "No" branch 372 bypassing quick access setup steps. In one embodiment, quick access information may be stored on the user's telephone. For example, the telephone may be programmed that when the "#" key is depressed, the telephone sends a service provider a sequence of numbers (i.e. 1,2,3,#) to access the user's account. Processing returns at 395.

FIG. 4 is a flowchart showing steps taken in limiting telephone calls corresponding to a telephone account. Processing commences at 400, whereupon user 415 selects an account (step 410). User 415 sends authorization information (i.e. user name and password) corresponding to the selected account (step 420). A determination is made as to whether user 415 is authorized to access the corresponding account information (decision 425). If user 415 is not authorized to access the corresponding account information, decision 425 branches to "No" branch 427 whereupon an error is returned to user 415 at 430.

On the other hand, if user 415 is authorized to access account information corresponding to his request, decision 425 branches to "Yes" branch 429 whereupon processing provides account information to user 415 from account data store 480 (step 435). Account data store 480 may be stored on a non-volatile storage area, such as non-volatile memory.

A determination is made as to whether user 415 wishes to configure limitations corresponding to his account (decision 440). For example, user 415 may wish to set limitations on his telephone usage in order to curb telephone charge costs. If user 415 does not wish to configure limitations corresponding to his account, decision 440 branches to "No" branch 448 bypassing limitation configuration steps. On the other hand, if user 415 wishes to configure limitations corresponding to his account, decision 440 branches to "Yes" branch 442.

A determination is made as to whether user 415 wishes to set a dollar amount limit corresponding to charges on his account (decision 450). Using the example described above, user 415 may wish to set a $20 monthly limit on telephone charges, regardless of the amount of minutes or long distance usage on the account. If user 415 wishes to set a dollar amount limit corresponding to charges on his account, decision 450 branches to "Yes" branch 452 whereupon processing receives a dollar amount limit from user 415 and stores the dollar amount limit in account data store 480 (step 455). On the other hand, if user 415 does not wish to set a dollar amount limit corresponding to charges on his account, decision 450 branches to "No" branch 458 bypassing dollar limitation steps.

A determination is made as to whether user 415 wishes to set a minute usage limit corresponding to his account (decision 460). Using the example described above, user 415 may have a calling plan that costs a specified amount which provides the user an allocated number of minutes and user 415 wishes to ensure that he does not exceed the number of allocated minutes. Another example is user 415 may wish to limit the amount of minutes for each call placed and received on his telephone. If user 415 wishes to limit the amount of minutes for use corresponding to his account, decision 460 branches to "Yes" branch 462 whereupon processing receives a minute usage limitation from user 415 and stores the minute usage limitation in account data store 480. On the other hand, if user 415 does not wish to specify a minute limitation corresponding to his account, decision 460 branches to "No" branch 468 bypassing minute limitation steps.

A determination is made as to whether user 415 wishes to block long distance calling (decision 470). Using the example describe above, user 415 may have a calling plan which costs a certain amount and provides him unlimited local calling but charges user 415 for long distance calls. If user 415 wishes to block long distance calling, decision 470 branches to "Yes" branch 472 whereupon long distance calling is blocked for the corresponding account (i.e. a flag is set) in account data store 480. On the other hand, if user 415 does not wish to block long distance calling, decision 470 branches to "No" branch 478 bypassing long distance blocking steps. Processing returns at 490.

Figure 5:
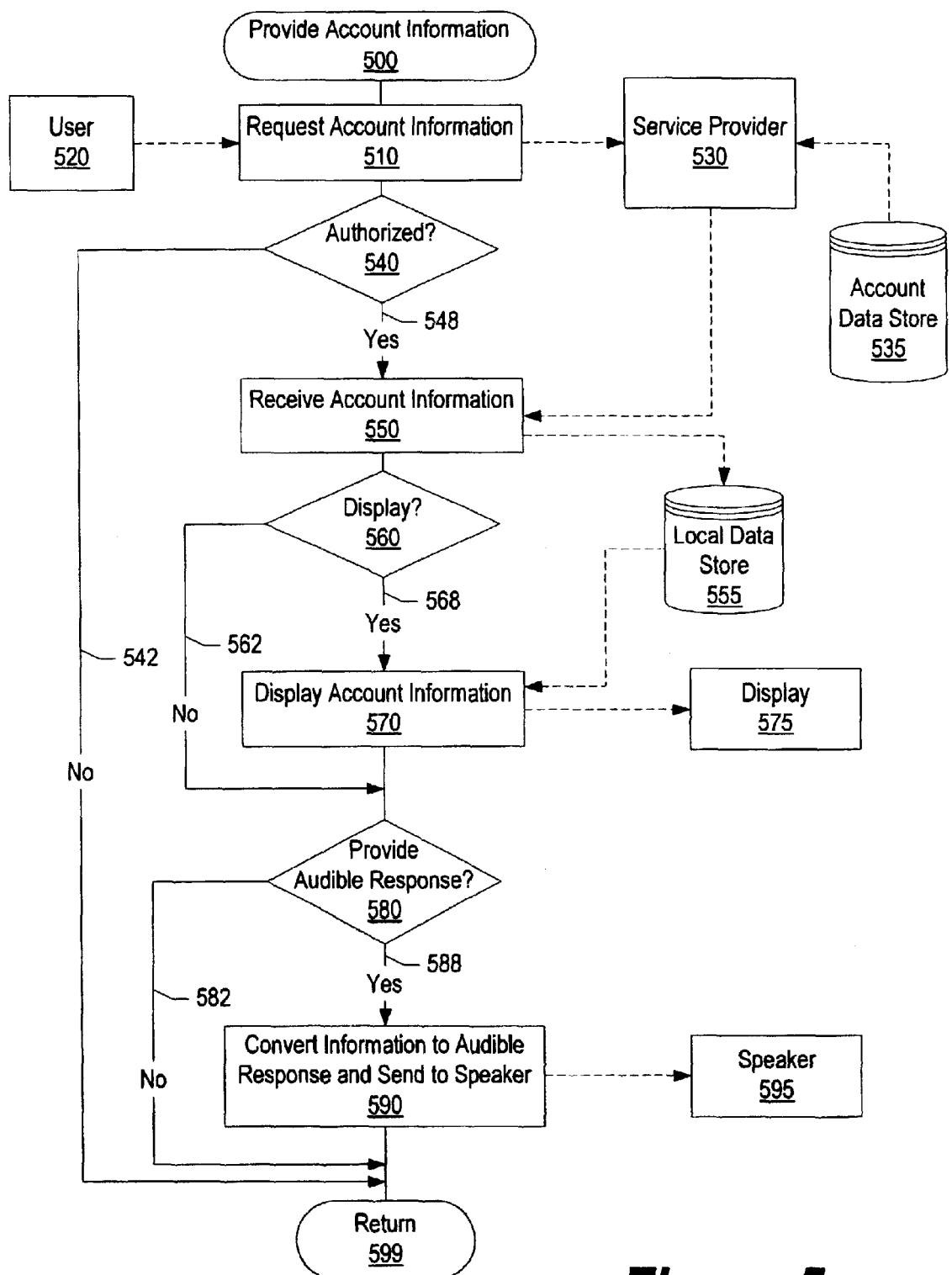
FIG. 5 is a flowchart showing steps taken in retrieving and displaying telephone account information.

FIG. 5 is a flowchart showing steps taken in providing telephone account information. Processing commences at 500, whereupon user 520 sends an account information request to service provider 530 (step 510). User 520's request may be from depressing a single button, or dialing a specialized number. A determination is made as to whether user 520's request is authorized (decision 540). For example, user 520's request may include a user name and password. If user 520's request is Rot authorized, decision 540 branches to "No" branch 542 bypassing account retrieval steps.

On the other hand, if user 520's request is authorized, decision 540 branches to "Yes" branch 548 whereupon service provider 530 sends corresponding account information from account data store 535 in which processing stores the account information in local data store 555 (step 550). Account data store 535 may be stored on a non-volatile storage area, such as a computer hard drive. Local data store 555 may be located in user 520's telephone and stored on a non-volatile storage area, such as non-volatile memory.

A determination is made as to whether to display the account information on display 575 located on user 520's telephone (decision 560). For example, user 520 may wish to review account information prior to placing a telephone call. If user 520 does not wish to display the account information, decision 560 branches to "No" branch 562 bypassing information-displaying steps. On the other hand, if user 520 wishes to display the account information, decision 560 branches to "Yes" branch 568 whereupon account information is retrieved from local data store 555 and displayed on display 575.

A determination is made as to whether to convert the account information to an audio message (decision 580). For example, user 520's telephone may not have a display and user 520 may wish to hear the account information through his telephone speaker. If processing should not convert the account information into an audio message, decision 580 branches to "No" branch 582 bypassing account information conversion steps.

On the other hand, if processing should convert the account information to an audio message, decision 580 branches to "Yes" branch 588 whereupon processing converts the account information to an audio message and sends the audio message to speaker 595 (step 590). As one skilled in the art can appreciate, processing may convert the account information to an audio message using a voice synthesizer. Processing returns at 599.

Figure 6:
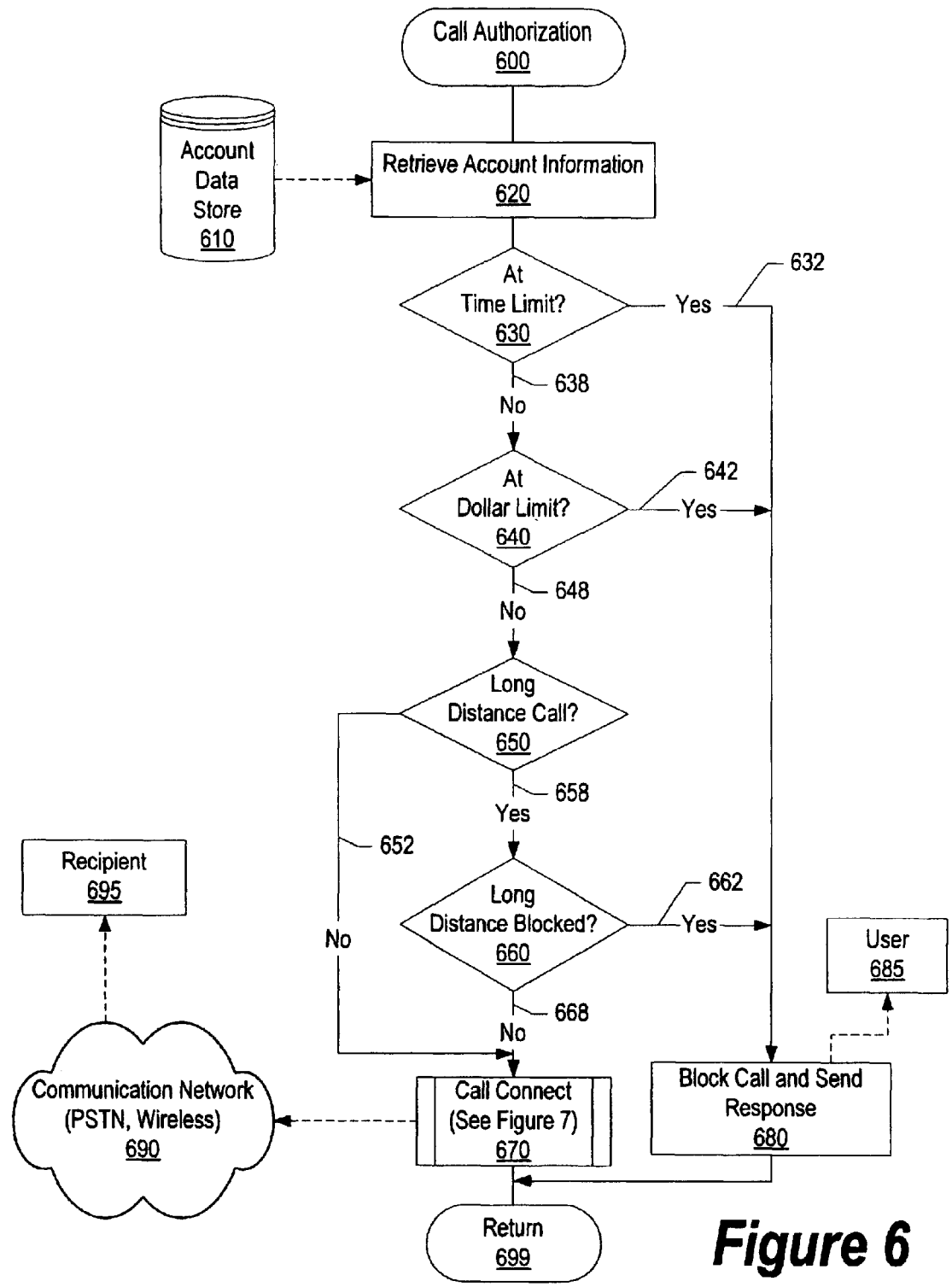
FIG. 6 is a flowchart showing steps taken in authorizing a telephone call using limits imposed on a corresponding telephone account.

FIG. 6 is a flowchart showing steps taken in authorizing a telephone call using user imposed telephone account limitations. The telephone call may be a user placing a telephone call or a user receiving a telephone call. Call authorization processing commences at 600, whereupon account information is retrieved from account data store 610 (step 620). The account information includes limitations imposed on the account along with incurred usage of the account. Account data store 620 may be stored on non-volatile storage area, such as non-volatile memory.

A determination is made as to whether the account has reached a minute usage limitation (decision 630). If the account has reached a minute usage limit, decision 630 branches to "Yes" branch 632 whereupon processing blocks the corresponding call and sends a message to user 685 signifying the account has reached a minute usage limitation. On the other hand, if the account has not reached a minute usage limit or if a minute usage limitation is not imposed, decision 630 branches to "No" branch 638.

A determination is made as to whether the account has reached an imposed dollar limit (decision 640). If the account has reached an imposed dollar limit, decision 640 branches to "Yes" branch 642 whereupon processing blocks the corresponding call and sends a message to user 685 signifying the account has reached an imposed dollar limit. On the other hand, if the account has not reached an imposed dollar limit or if a dollar limit is not set, decision 640 branches to "No" branch 648.

A determination is made as to whether the corresponding telephone call is a long distance call (decision 650). If the telephone call is not a long distance call, decision 650 branches to "No" branch 652 bypassing long distance blocking checks. On the other hand, if the telephone call is a long distance call, decision 650 branches to "Yes" branch 657 whereupon a determination is made as to whether the account is configured to block long distance calls (decision 660). If the account is configured to block long distance calls, decision 660 branches to "Yes" branch 662 whereupon processing blocks the corresponding call and sends a message to user 685 signifying that the account blocks long distance calls. On the other hand, if the account does not block long distance calls, decision 660 branches to "Yes" branch 668 whereupon processing places the call to recipient 695 through communication network 690, such as the Public Switched Telephone Network (PSTN) or wireless network (pre-defined process block 670, see FIG. 7 and corresponding text for further details). Processing returns at 699.

Figure 7:
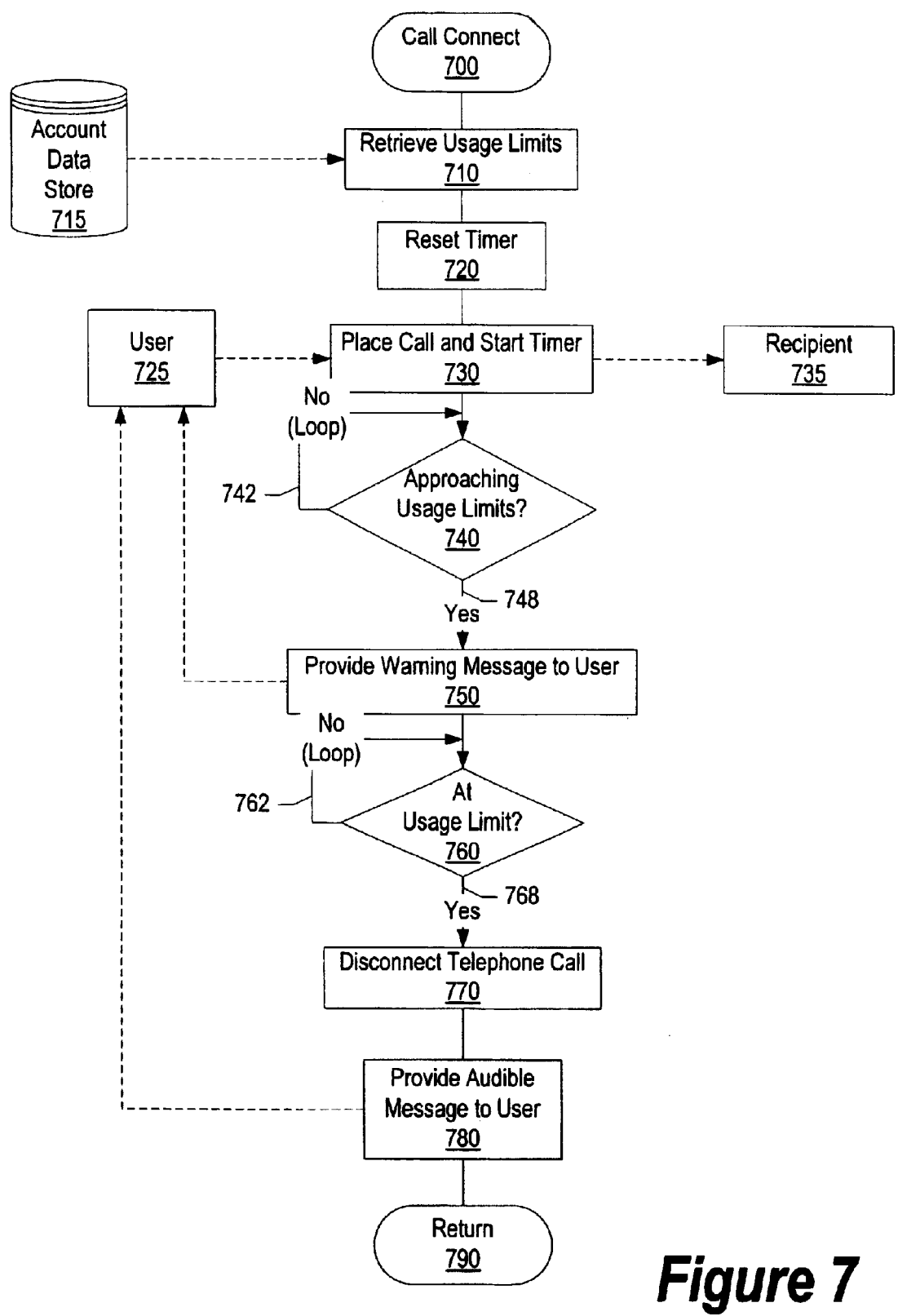
FIG. 7 is a flowchart showing steps taken in setting a timer and placing a telephone call.

FIG. 7 is a flowchart showing steps taken in setting a timer and placing a telephone call. Call connect processing commences at 700, whereupon usage limits are retrieved from account data store 715. Usage limits may limit the amount of time allowable for each phone call. For example, the usage limit may impose an allowable time limit of five minutes for each telephone call. Account data store 715 may be stored on a non-volatile storage area, such as non-volatile memory.

The timer is reset at step 720. Processing places the call between user 725 and recipient 735 and starts the timer (step 730). A determination is made as to whether the timer is approaching the usage limits (decision 740). If the timer is not approaching the usage limits, decision 740 branches to "No" branch 742 which loops back to check the timer. This looping continues until the timer approaches the usage limit, at which point decision 740 branches to "Yes" branch 748 whereupon a warning message is provided to user 725 at step 750. Using the example described above, a warning message may be provided to user 725 when the timer approaches four minutes.

A determination is made as to whether the timer has reached the usage limits (decision 760). If the timer has not reached the usage limits, decision 760 branches to "No" branch 762 which loops back to check the timer. This looping continues until the timer has reached the usage limits, at which point decision 760 branches to "Yes" branch 768 whereupon the telephone call is terminated (step 770). An audible message is provided to user 725 at step 780 signifying that the call has been terminated. Using the example described above, the telephone call is terminated when the timer reaches five minutes and processing sends a termination notification to user 725. Processing returns at 790.

Figure 8:
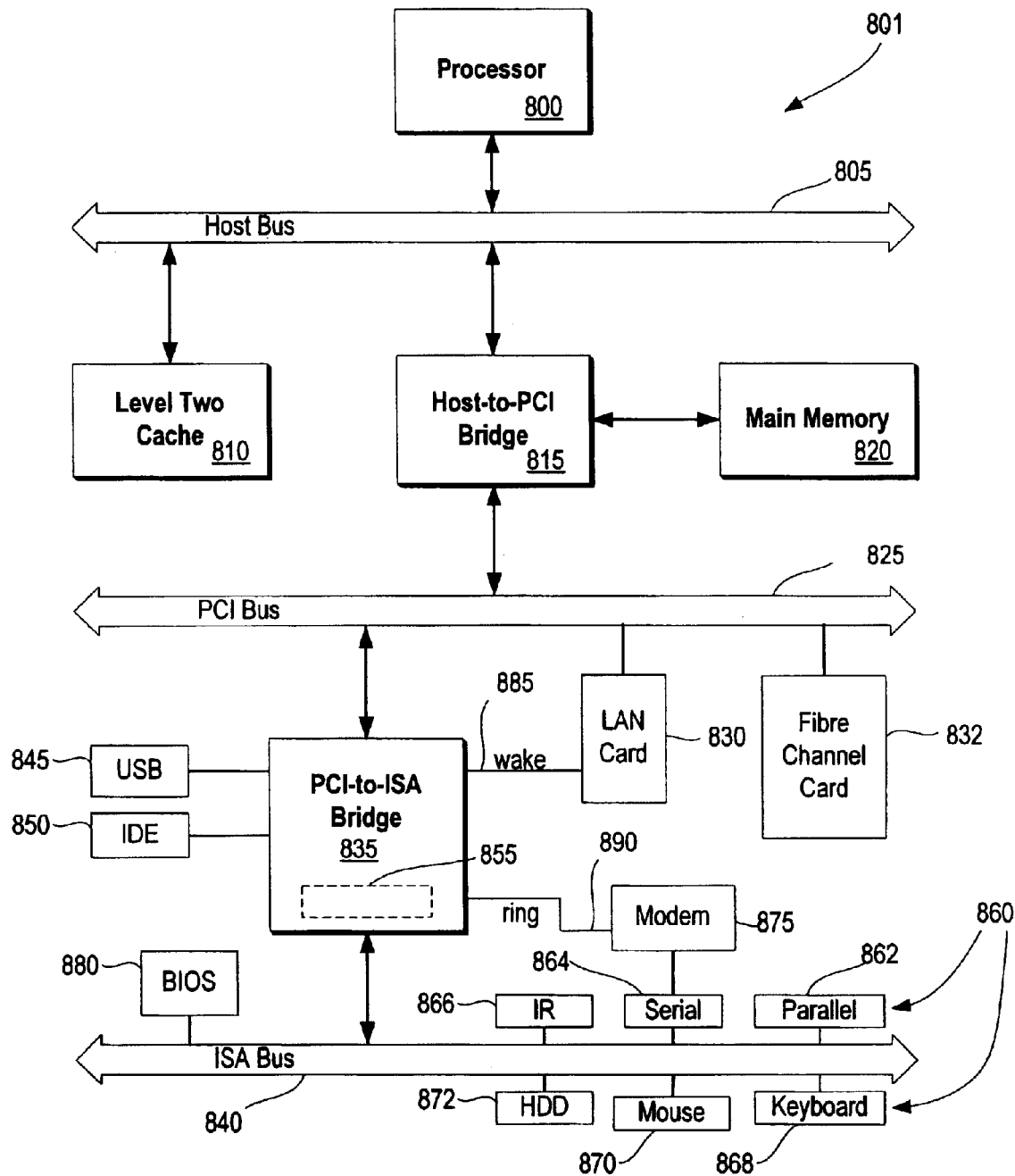
FIG. 8 is a block diagram of an information handling system capable of implementing the present invention.

FIG. 8 illustrates information handling system 801 which is a simplified example of a computer system capable of performing the invention described herein. Computer system 801 includes processor 800 which is coupled to host bus 805. A level two (L2) cache memory 810 is also coupled to the host bus 805. Host-to-PCI bridge 815 is coupled to main memory 820, includes cache memory and main memory control functions, and provides bus control to handle transfers among PCI bus 825, processor 800, L2 cache 810, main memory 820, and host bus 805. PCI bus 825 provides an interface for a variety of devices including, for example, LAN card 830. PCI-to-ISA bridge 835 provides bus control to handle transfers between PCI bus 825 and ISA bus 840, universal serial bus (USB) functionality 845, IDE device functionality 850, power management functionality 855, and can include other functional elements not shown, such as a real-time clock (RTC), DMA control, interrupt support, and system management bus support. Peripheral devices and input/output (I/O) devices can be attached to various interfaces 860 (e.g., parallel interface 862, serial interface 864, infrared (IR) interface 866, keyboard interface 868, mouse interface 870, and fixed disk (HDD) 872) coupled to ISA bus 840. Alternatively, many I/O devices can be accommodated by a super I/O controller (not shown) attached to ISA bus 840.

BIOS 880 is coupled to ISA bus 840, and incorporates the necessary processor executable code for a variety of low-level system functions and system boot functions. BIOS 880 can be stored in any computer readable medium, including magnetic storage media, optical storage media, flash memory, random access memory, read only memory, and communications media conveying signals encoding the instructions (e.g., signals from a network). In order to attach computer system 801 to another computer system to copy files over a network, LAN card 830 is coupled to PCI bus 825 and to PCI-to-ISA bridge 835. Similarly, to connect computer system 801 to an ISP to connect to the Internet using a telephone line connection, modem 875 is connected to serial port 864 and PCI-to-ISA Bridge 835.

While the computer system described in FIG. 8 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of limiting telephone calls at a mobile telephone, said method comprising:
    using the mobile telephone for a telephone call;
    retrieving one or mare usage limits, including a daily usage limit;
    retrieving a daily phone activity time, the daily phone activity time corresponding to the amount of time the mobile telephone is used in a day;
    comparing the daily usage limit with the daily phone activity time;
    determining whether the daily usage limit has been reached based on the comparing;
    blocking the telephone call in response to determining that the daily usage limit has been reached;
    setting a timer at the commencement of the telephone call;
    comparing the timer to the usage limits;
    providing an audible message to a user of the mobile telephone in response to the timer approaching the usage limits; and
    blocking the telephone call an response to the timer reaching the usage limits.

2. The method as described in claim 1 further comprising:
    storing the usage limits in a nonvolatile storage area included in the mobile telephone, wherein the retrieving one or more usage limits includes reading the usage limits from the nonvolatile storage area.

3. The method as described in claim 1 further comprising:
    storing the daily phone activity time in a nonvolatile storage area included in the mobile telephone.

4. The method as described in claim 1 further comprising:
    setting a password wherein the password corresponds to accessing the usage limits;
    prompting the user for the password; and
    configuring the usage limits in response to the user entering the password.

5. The method as described in claim 1 further comprising:
    retrieving stored account activity information from a non-volatile storage area included in the mobile telephone, the account activity information corresponding to an actual usage amount; and
    displaying the actual usage amount on a display attached to the mobile telephone.

6. The method as described in claim 1 further comprising:

using a second telephone to configure the usage limits;

sending the usage limits from the second telephone to a service provider, wherein the retrieving one or more usage limits includes receiving the usage limits from the service provider.

7. The method as described in claim 1 further comprising:

determining whether the telephone call is a placed long distance call; and retrieving a long distance usage limit from the usage limits in response to the determining.

8. The method as described in claim 1 wherein the using is selected from the group consisting of placing the telephone call and receiving the telephone call.

9. An information handling system comprising:

one or more processors;

a memory accessible by the processors;

one or more nonvolatile storage devices accessible by the processors;

a call limiting tool to limit telephone calls at a mobile telephone, the call limiting tool including:

means for using the mobile telephone for a telephone call;

means for retrieving one or more usage limits, including a daily usage limit;

means for retrieving a daily phone activity time, the daily phone activity time corresponding to the amount of time the mobile telephone is used in a day;

means for comparing the daily usage limit with the daily phone activity time;

means for determining whether the daily usage limit has been reached based on the comparing;

means for blocking the telephone call in response to determining that the daily usage limit has been reached;

means for setting a timer at the commencement of the telephone call;

means for comparing the timer to the usage limits;

means for providing an audible message to a user of the mobile telephone is response to the timer approaching the usage limits; and means for blocking the telephone call in response to the timer reaching the usage limits.

10. The information handling system as described in claim 9 further comprising:

means for storing the usage limits in a nonvolatile storage area included in the mobile telephone, wherein the means for retrieving one more usage limits includes means for reading the usage limits from the nonvolatile storage area.

11. The information handling system as described in claim 9 further comprising:

means for storing the daily phone activity time in a nonvolatile storage area included in the mobile telephone.

12. The information handling system as described in claim 9 further comprising:

means for using a second telephone to configure the usage limits;

means for sending the usage limits from the second telephone to a service provider, wherein the means for retrieving one or more usage limits includes means for receiving the usage limits from the service provider.

13. The information handling system as described in claim 9 further comprising:

means for determining whether the telephone call is a placed long distance call; and means for retrieving a long distance usage from the usage limits limit in response to the determining.

14. The information handling system as described in claim 9 wherein the means for using is selected from the group consisting of means for placing the telephone call and means for receiving the telephone call.

15. A computer program product stored in a computer operable media for limiting telephone calls at a mobile telephone, said computer program product comprising:

means for using the mobile telephone for a telephone call;

means for retrieving one or more usage limits, including a daily usage limit;

means for retrieving a daily phone activity time, the daily phone activity time corresponding to the amount of time the mobile telephone is used in a day;

means for comparing the daily usage limit with the daily phone activity time;

means for determining whether the daily usage limit has been reached based on the comparing;

means for blocking the telephone call in response to determining that the daily usage limit has been reached;

means for setting a timer at the commencement of the telephone call;

means for comparing the timer to the usage limits;

means for providing an audible message to a user of the mobile telephone in response to the timer approaching the usage limits; and means for blocking the telephone call in response to the timer reaching the usage limits.

16. The computer program product as described in claim 15 further comprising:

means for storing the usage limits in a nonvolatile storage area included in the mobile telephone, wherein the means for retrieving one or more usage limits includes means for reading the usage limits from the nonvolatile storage area.

17. The computer program product as described in claim 15 comprising:

means for storing the daily phone activity time in a nonvolatile storage area included in the mobile telephone.

18. The computer program product as described in claim 15 further comprising:

means for using a second telephone to configure the usage limits;

means for sending the usage limits from the second telephone to a service provider, wherein the means for retrieving one or more usage limits includes means for receiving the usage limits from the service provider.

19. The computer program product as described in claim 15 further comprising:

means for determining whether the telephone call is a placed long distance call; and means for retrieving a Long distance usage Limit from the usage limits in response to the determining.

20. The computer program product as described in claim 15 wherein the means for using is selected from the group consisting of means for placing the telephone call and means for receiving the telephone call.

* * * * *